United States Patent
McKay et al.

(10) Patent No.: US 10,253,381 B2
(45) Date of Patent: Apr. 9, 2019

(54) PROCESS FOR THE PRODUCTION OF SOLID SACCHARIDES FROM AN AQUEOUS SACCHARIDE SOLUTION

(71) Applicant: Avantium Knowledge Centre B.V., Amsterdam (NL)

(72) Inventors: Benjamin McKay, Amsterdam (NL); Gerardus Johannes Maria Gruter, Amsterdam (NL)

(73) Assignee: Avantium Knowledge Centre B.V., Amsterdam (NL)

( * ) Notice: Subject to any disclaimer, the term of this patent is extended or adjusted under 35 U.S.C. 154(b) by 0 days.

(21) Appl. No.: 15/535,547

(22) PCT Filed: Dec. 18, 2015

(86) PCT No.: PCT/NL2015/050880
§ 371 (c)(1),
(2) Date: Jun. 13, 2017

(87) PCT Pub. No.: WO2016/099272
PCT Pub. Date: Jun. 23, 2016

(65) Prior Publication Data
US 2017/0369956 A1    Dec. 28, 2017

(30) Foreign Application Priority Data
Dec. 18, 2014 (NL) ..................................... 2014007

(51) Int. Cl.
| | | |
|---|---|---|
| *C13K 1/04* | (2006.01) | |
| *C13K 1/08* | (2006.01) | |
| *B01D 1/22* | (2006.01) | |
| *B01D 21/26* | (2006.01) | |
| *C01B 7/07* | (2006.01) | |
| *C13B 25/00* | (2011.01) | |
| *C13K 13/00* | (2006.01) | |

(52) U.S. Cl.
CPC .............. *C13K 1/04* (2013.01); *C13B 25/003* (2013.01); *C13K 1/08* (2013.01); *C13K 13/00* (2013.01); *B01D 1/22* (2013.01); *B01D 21/26* (2013.01); *C01B 7/0737* (2013.01)

(58) Field of Classification Search
CPC ... C13K 1/04; C13K 1/08; B01D 1/22; B01D 21/26; C13B 25/003; C01B 7/0737
USPC .......................................................... 536/127
See application file for complete search history.

(56) References Cited

U.S. PATENT DOCUMENTS

| | | | | |
|---|---|---|---|---|
| 2,305,833 A | | 12/1942 | Warth | |
| 2,944,923 A | | 7/1960 | Riehm | |
| 5,350,456 A | * | 9/1994 | Schwab | ................... C13K 1/10 |
| | | | | 127/42 |
| 2013/0168226 A1 | | 7/2013 | Kose et al. | |
| 2013/0239954 A1 | | 9/2013 | Kilambi et al. | |

FOREIGN PATENT DOCUMENTS

| | | |
|---|---|---|
| CN | 1936025 A | 3/2007 |
| DE | 362230 | 10/1922 |
| DE | 640775 | 1/1937 |
| DE | 1567335 | 9/1970 |
| EP | 2622127 B1 | 7/2014 |
| GB | 1308174 | 2/1973 |
| JP | H7-8703 A | 1/1995 |
| JP | H11-500913 A | 1/1999 |
| JP | 2006-67995 A | 3/2003 |
| JP | 2003-304819 A | 10/2003 |
| JP | 6264863 B2 | 1/2018 |
| WO | 2014/074066 A1 | 5/2014 |

OTHER PUBLICATIONS

Pandya, Priyanka, et al., "Co-solvent Evaporation Method for Enhancement of Solubility and Dissolution Rate of Poorly Aqueous Soluble Drug Simvastatin: In vitro-In vivo Evaluation", AAPS PharmSciTech, vol. 9, No. 4, pp. 1247-1252, Dec. 2008.
Third Party Observation at the Japanese Patent Office, dated Jan. 31, 2019.

* cited by examiner

*Primary Examiner* — Yih-Horng Shiao
(74) *Attorney, Agent, or Firm* — Hoffman & Baron, LLP

(57) ABSTRACT

Solid saccharides are produced from an aqueous saccharide solution in a process, where the aqueous saccharide solution is admixed with a carrier liquid in which the saccharides are insoluble and that has a boiling point higher than that of water to obtain an aqueous admixture, and where the aqueous admixture is subjected to an evaporation step. The heat for the evaporation is at least partially supplied by a heated surface area to yield a vapor fraction including water and a residue fraction including solid saccharides and carrier liquid.

18 Claims, No Drawings

PROCESS FOR THE PRODUCTION OF SOLID SACCHARIDES FROM AN AQUEOUS SACCHARIDE SOLUTION

CROSS-REFERENCE TO RELATED APPLICATIONS

This application is the National Stage of International Application No. PCT/NL2015/050880 filed Dec. 18, 2015, which claims the benefit of Netherlands Application No. NL 2014007, filed Dec. 18, 2014, the contents of which is incorporated by reference herein.

FIELD OF THE INVENTION

The present invention relates to a process for the production of solid saccharides from an aqueous saccharide solution. In particular it relates to a process for the recovery of saccharides from a hydrolysate of biomass, for example from the hydrolysate of wood.

BACKGROUND OF THE INVENTION

It has been known for many years how to hydrolyze and dissolve organic matter from wood. Generally, there are two ways to achieve hydrolysis and dissolution of the carbohydrate substances in wood; the use of dilute acids at high temperature and pressure or the use of concentrated acid at low temperature and pressure. In the Bergius-Rheinau process wood is shredded to chips which are treated with concentrated hydrochloric acid. During the treatment two-thirds of the wood is dissolved by the acid in the form of mono- and oligosaccharides, one third remains as lignin. The saccharides are separated from the hydrochloric acid solution in the next phase. The separation is achieved by evaporation in a tubular evaporator under vacuum at a temperature of about 36° C. After evaporation the resulting syrup that contains 55 to 65% wt of saccharides is spray dried. The resulting solid product contains 1 to 2% wt of hydrochloric acid, some 8% wt of water and about 90% wt of saccharides (cf. F. Bergius, Current Science, 1937, 632-637). Hence, the solid was not very pure. Moreover, as indicated in U.S. Pat. No. 2,944,923, the evaporation to remove the water requires a large heat supply. In order to overcome these drawbacks, it is proposed in U.S. Pat. No. 2,944,923 to pass the saccharides solution from the hydrolysis of wood in a single passage at atmospheric pressure upwardly through externally heated evaporator tubes in which it partially evaporates. During the evaporation especially the hydrochloric acid is removed. The temperature in the evaporator tubes is about 140 to 150° C. The product of such a process is a more concentrated saccharides solution. From the examples it appeared that the solution still contained about 7% of all hydrochloric acid that was introduced into the evaporator. Further, although it is mentioned in U.S. Pat. No. 2,944,923 that the process incurs hardly any saccharide loss, it is well known that at such temperatures carbohydrates decompose, especially in an acidic aqueous environment.

A different way of removing the volatile hydrochloric acid from a sugar-containing wood hydrolysate is described in DE 362230. According to the therein described process a hot liquid heat carrier that is immiscible with the aqueous hydrolysate is mixed with the aqueous hydrolysate. Examples of heat carriers are shale oil, refined petroleum and refined paraffin oil. The heated carrier liquid drives the volatile hydrochloric acid out of the sugar-containing wood hydrolysate. Since the heat carrier has been heated the temperature of the resulting mixture is increased and hydrochloric acid and some water are vaporized. However, it has also been stated in DE 362230 that for the hourly treatment of 100 liters of aqueous hydrolysate 10,000 liters of recycled heat carrier is required. Moreover, the heat carrier is stated to absorb some water and hydrochloric acid. It is therefore proposed in DE 362230 that in order to render the heat carrier suitable for recycling after separation from the hydrolysate, it has to be treated over calcium chloride in order to remove any absorbed hydrochloric acid and water. The inventory of heat carrier in this process is therefore huge. Moreover, the product of this known process is not the solid saccharide but an aqueous saccharide solution.

Chinese patent application CN1936025 also describes the production of a liquid polydextrose solution wherein the production may involve a variety of treatments of a crude polydextrose solution. Such treatments include reverse osmosis, ion exchange treatments, filtration and discoloration with active carbon. In an embodiment a solution of glucose is treated in a triple-effect evaporator into which an oil is introduced as an indirect heat transfer medium. The result is a more concentrated glucose solution.

Solid saccharides are produced in the process according to US 2013/0168226. In this process a container is filled with a hot heat carrier which is immiscible with an aqueous hydrolysate of biomass. Hydrolysate, comprising water, hydrochloric acid and saccharides, is sprayed into the hot heat carrier, so that evaporation of water and hydrochloric acid takes place. Since the hydrolysate has to be sprayed just under the surface of the heat carrier, a nozzle manifold is required to ensure a good distribution of hydrolysate over the cross-sectional area of the container. Saccharides precipitate in the form of solid particles and these particles are recovered from the hot carrier. This runs the risk that the bottom is contaminated with scale which complicates the recovery of the sacharides precipitate. Although this process yields solid saccharides, it is evident that the temperature of the heat carrier cannot be very high in order to avoid decomposition of saccharides. Therefore, the amount of heat carrier must be very high in order to provide sufficient energy for the evaporation of hydrochloric acid and water. The process according to US 2013/0168226 suffers the same drawback as the process according to DE 362230, viz. in that it requires a large amount of heat carrier to cause sufficient evaporation of hydrochloric acid and water.

SUMMARY OF THE INVENTION

It has now been found that an excellent removal of hydrochloric acid and water can be achieved with the use of a reasonable amount of a liquid carrier if an evaporation step is applied to a mixture of carrier and aqueous saccharide solution wherein the heat for the evaporation is supplied by a heated surface area. Accordingly, the present invention provides a process for the production of solid saccharides from an aqueous saccharide solution, wherein the aqueous saccharide solution is admixed with a carrier liquid in which the saccharides are insoluble and that has a boiling point higher than that of water to obtain an aqueous admixture, and wherein the aqueous admixture is subjected to an evaporation step, wherein the heat for the evaporation is at least partially supplied by a heated surface area, to yield a vapor fraction comprising water, and a residue fraction comprising solid saccharides and carrier liquid.

The evaporation step is conducted in an equipment that comprises a heated surface area. Differences between the process according to the present invention and the processes according to DE 362230 and US 2013/0168226 reside inter alia in that evaporation of water occurs at the heated surface area of the equipment rather than by contact with a heated carrier liquid. The process according to CN1936025 does not involve the admixing of an aqueous saccharide solution with a carrier liquid. Moreover, the product is different.

Although the process according to the present invention is excellently suited for the treatment of hydrolysate of wood or other biomass, it can be advantageously applied to a variety of saccharide solutions. It may suitably be applied to aqueous saccharide solutions comprising at least one of the group selected from glucose, fructose, mannose, arabinose, xylose, sucrose, cellobiose, maltose, cellotriose, maltotriose, cellodextrins, dextrins, xylan-oligosaccharides, mannan-oligosaccharides, arabinan-oligosaccharides, oligofructans, starch and cellulose. Some saccharides are partly soluble in water. The saccharide solution therefore may also comprise solid saccharides, the obvious examples thereof being cellulose and starch. Preferably, the aqueous solution is a clear solution without any significant amount of insoluble material. The aqueous solution therefore preferably has a concentration of saccharides that is up to their saturation. The level of saturation is different for different saccharides. Whereas glucose is very soluble in water, e.g. about 910 g/L at room temperature, other monosaccharides are also well soluble, but cellobiose already is less soluble, viz. about 120 g/L. Typically, the aqueous saccharide solution has a saccharides concentration of 10 to 90% wt, preferably 10 to 60% wt, based on the solution.

A clear aqueous saccharide solution may be obtained in the hydrolysis of biomass. The hydrolysis of biomass may be carried out as the Bergius-Rheinau process along the lines described above. Whereas the Bergius-Rheinau process uses concentrated hydrochloric acid it is also known to use other acids for the dissolution of organic material in wood. The Scholler or Madison process, for example, is also used for the dissolution of biomass, and these processes employ dilute sulfuric acid (cf. DE 640775 and DE 1567335). The present process, though, is not limited to the hydrolysate of wood obtained by the Bergius-Rheinau process or Scholler process. It may be used for any aqueous saccharides solution. There are also aqueous saccharide solutions obtained in hydrolysis processes of wood wherein no acid is used. Two-stage hydrolysis processes wherein only water was used for the hydrolysis of biomass at high temperature and pressure have been described in e.g. EP 2622127 and US 2013/0239954. However, typically, the aqueous saccharides solution comprises an acid, preferably selected from the group consisting of hydrochloric acid, hydrobromic acid, nitric acid, formic acid, sulfuric acid and combinations thereof, in particular hydrochloric acid.

The original Bergius-Rheinau process is conducted by using concentrated hydrochloric acid only. Over the years further developments of this process took place. In U.S. Pat. No. 2,305,833 the Bergius-Rheinau process using a concentrated hydrochloric acid solution is described. The process according to U.S. Pat. No. 2,305,833 is directed to an improvement over such a process, wherein the improvement resides in that the biomass is not only contacted with a very strongly concentrated hydrochloric acid solution, but that the hydrolysis is achieved in two stages, wherein in the first stage biomass is contacted with a hydrochloric acid solution with a very high concentration, viz. such that the density is at least 1.16, and the resulting mixture is subsequently contacted with a less concentrated solution of hydrochloric acid in a second stage. This process illustrates that when the aqueous saccharide solution contains acid, the acid concentration may be within a wide range of concentrations. Suitably, the aqueous saccharide solution contains an acid with an acid concentration of 1 to 45% wt, based on the solution.

DETAILED DESCRIPTION OF THE INVENTION

The present process is particularly suitable for treating the hydrolysate of biomass, as obtained by a process similar to the Bergius-Rheinau process, described above. The biomass used in such a process is typically wood, but any carbohydrate-containing material may be used for this process. Such material includes biomass selected from wood, stover, bark, other leaves, grasses, other stalks, empty fruit bunches and combinations thereof. Wood is the preferred feedstock. The wood may originate from all types of trees, including spruce, willow, oak, birch, poplar, eucalyptus and any other tree. The biomass feedstock may be subjected to hydrolysis in a variety of forms, including chips, pellets, powder, crushed particles, milled particles or ground particles. When the biomass feedstock comprises wood the feedstock may be in the form of wood powder, wood chips, wood pellets, wood briquettes, wood chunks and combinations thereof. The result of such processes is a biomass hydrolysate. Other suitable saccharide solutions include sugar cane juice and sugar beet juice and aqueous solutions of glucose and fructose such as high fructose syrups, e.g. high fructose corn syrup (HFCS) and invert sugar syrup from the hydrolysis of sucrose. Combinations of such saccharide solutions may also be used.

The saccharide solution is aqueous. That does not necessarily mean that the only volatile compound is water. In certain cases during the manufacture of the saccharides solution other components, including diluents, may be incorporated into the aqueous solution. Such incorporation may be done deliberately, e.g. to influence the solubility of one or more of the saccharides. When an organic diluent is present in the aqueous solution, it is preferably selected from alcohols, aldehydes, ketones, amides, sulfoxides and carboxylic acids that have a boiling point of at most 150° C., preferably at most 100° C. The diluents are suitably miscible with water. Since the atmospheric boiling point of these diluents is below 150° C., preferably 100° C., they can conveniently be removed together with water in the evaporation step. As the solubility of saccharides is generally reduced by the incorporation of organic diluents, the amount of diluents is preferably at most 10% wt, based on the solvent, and more preferably at most 5% wt. Most preferably the aqueous saccharide solution does not contain any of the diluents mentioned.

The heat for the evaporation is at least partially supplied by a heated surface area. All the heat for evaporation can be supplied by the heated surface area. Thus, when the carrier liquid is admixed with the aqueous saccharide solution it has preferably not been heated. The temperature of the carrier liquid is suitably in the range of 10 to 110° C., preferably from 15 to 50° C., most preferably at about room temperature, e.g. 17 to 25° C. It may have the same temperature at which the aqueous saccharide solution becomes available. Such conditions prevent premature evaporation of any acid that is available. It also avoids thermal decomposition of the saccharides in the aqueous saccharide solution.

The carrier liquid has a boiling point above that of water. In order to facilitate the separation of the carrier liquid from the water and, optionally, from the acid, the carrier liquid preferably has an atmospheric boiling point that is at least 60° C., more preferably 75° C., above that of water. Hence the carrier liquid preferably has a boiling point of at least 175° C. In order to facilitate the separation even further the atmospheric boiling point of the carrier liquid is suitably at least 200, more preferably at least 240° C. The upper limit of the boiling point range for the carrier liquid is not critical. The only requirement for the carrier liquid is that it is in the liquid phase when it is admixed to the aqueous solution and when it is recovered as residue fraction comprising solid saccharides.

The carrier liquid is selected from the liquids in which saccharides are insoluble. In this specification by 'insoluble' is understood that a substance in question dissolves for less than 1 g/100 mL at 25° C. The carrier liquid may be miscible with water, as long as saccharides are insoluble therein. When a carrier liquid is immiscible with water, saccharides tend to be insoluble in such a carrier liquid. Hence, the carrier liquid is preferably immiscible with water. In this specification by 'immiscible' is understood that when a volume of water and a volume of the carrier liquid are added to form a mixture the volumes of the liquid layers that emerge deviate less than 5% vol/vol from the volumes that were originally added to form the mixture.

Suitable carrier liquids have been proposed in the prior art. Such carrier liquids are advantageously hydrocarbonaceous oils. Examples of such oils are shale oil, refined petroleum oils, and refined paraffin oils, as already disclosed in DE 362230. Also suitable oils are polyisobutylene, poly-alpha-olefins, other branched polyolefins and other petroleum liquids with a sufficiently high boiling point. The oils are also characterized by their viscosity. Suitable oils have a kinematic viscosity in the range of 1 to 200 cSt (mm$^2$/s) at 100° C., determined in accordance with ASTM D 445.

An alternative type of oil is the polymers and oligomers of alkylene glycol. The miscibility of such polymers depends on the chain length, both as to the number of alkylene oxide monomers and the number of carbon atoms in the alkylene oxide monomer itself. Already the dimer of ethylene glycol, having a boiling point of about 245° C. is a suitable carrier liquid. Hence, when the polyalkylene oxide is a polymer of ethylene oxide, the number of ethylene oxide units may suitably be as low as two. The higher polymers are usually characterized by their average molecular weight. Polyethylene oxides are prepared with very high molecular weights, e.g. up to 10,000,000. However, typically the upper limit of the molecular weight of the polyethylene oxide that may be used in the present process is generally about 25,000. In addition to polyethylene glycol polymers of other alkylene oxides may be used, in particular polymers of alkylene oxides having 2 to 6 carbon atoms, such as polypropylene glycol, polybutylene glycol and mixtures thereof.

Therefore, the carrier liquid of the present invention is preferably hydrocarbon oil or a polymer of an alkylene oxide.

One of the advantages of the present invention over the prior art processes resides in that a relatively small inventory of carrier liquid is to be employed. According to DE 362230 10,000 liters of carrier liquid are required to handle an hourly stream of 100 liter of hydrolysate. In the process according to US 2013/0168226 no ratio is mentioned, but the process description makes it clear that a large excess is required. In the process according to the present invention the ratio of the saccharide solution and the carrier liquid may vary between wide ranges. From an economic point of view an also from the standpoint of energy supply the amount of carrier liquid is as small as possible. The lower limit of the amount of carrier liquid is determined by the effectiveness of transporting solid precipitated saccharides from the evaporation step. Typically, it has been found that the ratio of aqueous saccharide solution to carrier liquid is in the range of 5:1 to 1:10, more preferably from 2:1 to 1:5, expressed as weight/weight. The ratio may be as low as about 1:1. Such reduced amount of carrier liquid relative to the amount of aqueous saccharide solution represents a considerable saving on oil inventory, and leads to reduced equipment size and easier recovery of solid saccharides, and thus provides a significant advantage over the prior art processes.

The admixture of carrier liquid and aqueous saccharide solution is subjected to an evaporation step. Evaporation takes place at a surface and may be carried out at a temperature which can be below the boiling point of water. The evaporation may also be conducted at reduced pressure. That not only means that a relatively small amount of carrier liquid needs to be heated, but also that the temperature can be low, meaning that any possible decomposition of saccharides is avoided. Further, evaporation from films on a heated surface area allows for short residence times. This represents an advantage over the use of the process according to US 2013/016826, wherein the residence time of the saccharides in the container filled with hot heat carrier is significantly longer. The short residence times that are now made possible further reduce the risk of thermal decomposition of the saccharides.

Evaporation is basically a separation method that uses heat transfer to separate components that have different boiling points and relative volatilities, wherein one or more components evaporate from the surface. Since evaporation is a surface-related phenomenon evaporation is often applied to liquid films. There are many commercial types of equipment for evaporation. Such suitable equipment includes a stirrer evaporator, rising film evaporator, natural circulation evaporator, forced circulation evaporator, falling film evaporator, rising-falling film evaporator, thin film evaporator (also known as a wiped film evaporator) or short path distillation evaporator, falling film short path distillation evaporator, fluidized bed evaporator, falling film counter-flow trickle evaporator or spiral tube evaporator. One or more of these equipment types may advantageously be selected for application in the process of the present invention.

Film evaporators are preferred as they minimize residence time of the admixture on the heated surface and also minimize the inventory of carrier liquid. Therefore the evaporation step is preferably conducted in one or more of the equipment selected from a rising film evaporator, a falling film evaporator, a rising-falling film evaporator, a short path distillation evaporator, and a falling film counterflow trickle evaporator.

Alternatively, evaporators that can accommodate the presence of solids are also preferred, as they minimize operational issues related to disruption of films by solids encrustation and fouling of heat exchange surfaces. Therefore, the evaporation step is preferably conducted in one or more of the equipment selected from a forced circulation evaporator or stirrer evaporator.

More preferably, the evaporation is performed in two stages, the first stage comprising a film evaporator, and the second stage comprising an evaporator that can accommodate the presence of solids, so as to avoid solid formation in the film evaporator while minimizing the residence time in the second evaporator stage. Therefore, in a most preferred embodiment of the invention, the evaporation is conducted first in a falling film evaporator followed by a forced recirculation evaporator.

The evaporation is suitably carried out at temperatures in the range of 50 to 120° C., more preferably in the range of 80 to 110° C. The lower limit is suitably such that the evaporation of water, and optionally acid, such as hydrochloric acid, occurs at a reasonably high rate. The upper limit may be selected such the risk of thermal decomposition of any of the saccharides is minimal. To provide for a relatively fast evaporation of water and optionally acid, the evaporation is suitably conducted at reduced pressure, preferably below 100 mbar. A suitable pressure is in the range of 3 to 80 mbar, preferably from 5 to 60 mbar.

One of the advantages of evaporation resides in the possibility to apply short residence times. Dependent on the equipment and the product composition the residence time of the admixture in the evaporator can be determined by the skilled person. Suitably, the residence time is short and may typically be in the range of 5 sec to 40 min, preferably from 0.1 to 30 min, more preferably from 0.25 to 20 min. The actual contact time of the product composition with the heated surface in an evaporator may be in the order of seconds, so that water vaporizes and the combination of carrier liquid with saccharides flow downwards. The vapor fraction is then withdrawn from the evaporator. The residue fraction containing the majority, if not all, of the saccharides is quickly discharged.

The vapor fraction comprising water may be discharged or purified and re-used. Especially when the aqueous saccharide solution comprises an acid and when the acid is also evaporated, it is typical to recover at least the acid from the vapor fraction. This can be achieved by condensation of the vapor fraction to yield a solution of the acid in water. Any further treatment to render the acid suitable for subsequent use, e.g. in the hydrolysis of biomass, may be accomplished in a manner similar to the treatment of the hydrochloric acid in the Bergius-Rheinau process or the sulfuric acid in the Scholler or Madison process.

Suitably, the residue fraction is subjected to separation into a solid stream comprising the solid saccharides and a liquid stream comprising the carrier liquid. For this separation any conventional solid/liquid separation method may be used. Therefore, the residue fraction is preferably separated by means of a solid-liquid separation operation selected from settling, filtration, hydrocyclone separation, centrifugation and combinations thereof. Depending on the nature of the carrier liquid and the effectiveness of the evaporation the solid material contains very little water. The solids stream may be subjected to purification, if desired. One suitable purification method is by washing the saccharides. Suitable washing liquids comprise polar organic compounds such as alcohols and ketones. Mixtures of water and these organic compounds may also be used. The advantage of the use of these liquids resides in that these liquids can take up acid and water, whereas the solid saccharides are insoluble in these liquids. Dependent on the saccharides the washing liquids may contain water up to a significant amount. Preferably, the amount of water in the washing liquids is at most 20% wt, based on the washing liquid.

The solid saccharides obtained in the solids stream may also be dried in order to remove any remaining water. Since it is desirable to refrain from exposing the solid saccharides to high temperatures, such as temperatures above 100° C. for a significant time, it is desirable to dry the solid saccharides at a temperature of 50 to 90° C., e.g. in an oven. The pressure may be atmospheric. Advantageously, the drying is conducted at reduced pressure, e.g. in the range of 1 to 900 mbar. The lower pressures facilitate the evaporation of water that is adsorbed on the solid saccharides.

In another embodiment of the present process the residue fraction is subjected to admixture with a liquid wherein the solid saccharides can dissolve. The obtained saccharides solution is then separated from the carrier liquid, preferably via liquid-liquid phase separation. Accordingly, the present process also provides that the residue fraction is mixed with a second solvent that is immiscible with the carrier liquid and in which the saccharides are soluble yielding two liquid phases, and wherein the two liquid phases are separated to yield a second solution stream comprising the saccharides dissolved in the second solvent and a second liquid stream comprising the carrier liquid. This embodiment is especially useful for the situation wherein the original aqueous saccharide solution comprises an acid, for example when the solution has been obtained as the hydrolysate of a Bergius-Rheinau or Scholler process. Since the acid has been removed virtually completely from the solid saccharides the second solution stream that is obtained is substantially free from acid. Evidently, it is possible to recover the saccharides as solids. This may be accomplished by mixing the second solvent with another liquid in which the saccharides are insoluble, thereby reducing the solubility of the saccharides and causing their precipitation. In this way possible impurities may be retained in the mixture of the second solvent and the other liquid, and more pure saccharides may be obtained.

When the carrier liquid is immiscible with water the second solvent preferably is water. Water generally will dissolve the saccharides in the residue fraction. Due to the mutual immiscibility the carrier liquid and water-saccharide solution will form two phases that may be separated by conventional liquid-liquid separation. Suitably, one or more liquid-liquid separators, preferably selected from a gravity settler, an enhanced gravity settler, a coalescer, a hydrocyclone, a centrifuge and combinations thereof, can be used.

The liquid stream comprising the carrier liquid that is obtained from the solid-liquid separators or the liquid stream that is obtained after removal of the second solution stream, is suitably at least partly recycled to be admixed with the aqueous saccharide solution. The liquid stream may be purified or dried, if desired. Preferably the entire liquid stream is recycled. If necessary, the recycled carrier liquid may be supplemented with make-up carrier liquid.

The entire process may be conducted in separate batch-wise steps. However, preferably the process of the present invention is carried out as a continuous process.

The invention is further illustrated by means of the following example.

EXAMPLE

To show the suitability of the present process for treating a commercial Bergius Rheinau hydrolysate a model solution was prepared by combining 11 weight units of cellobiose and 43 weight units of a 37% wt HCl solution in water. This model mixture was admixed with 46 weight units of diethylene glycol.

This admixture was subjected to evaporation in a short path distillation unit, consisting basically of a cylindrical body with a heating jacket, a rotor and condenser inside. On the rotor wiper blades have been mounted such that a thin film of liquid is created on the inner wall of the body as the wipers rotate. The inner wall of the body is heated by a heat transfer medium in the jacket surrounding the body. A vapor fraction passes to the condenser and partly condenses. Any remaining vapors are removed from the top of the body and caught by a cold trap. A residue fraction is recovered from a drain at the bottom of the body.

The conditions of two experiments are shown in the Table below, wherein the feed rate ("F") is the rate at which the admixture is fed into the unit, the temperature ("T") indicates the temperature of the heat jacket, the pressure ("P") indicates the reduced pressure in the unit, and time ("t") indicates the period during which the evaporation was carried out. The table also shows the results by means of the vapor fraction ("Vapor") which means the combined yield of the condensed vapors from the condenser and the condensed compounds caught in the cold trap, operating at −78° C., and the residue fraction ("Residue") which represents the amount of liquid and solids recovered at the bottom of the unit.

During the experiments clear and colorless liquids were obtained from the vapor fractions, both in the condenser and in the cold trap. No cellobiose or any other saccharide was found in the vapor fractions. The residue fractions were found to be suspensions, clearly showing precipitates. The suspensions formed liquid films that easily drained from the evaporator.

In the residue fractions the water content ("H$_2$O") was determined, expressed in % wt based on the residue fraction. The results are also shown on the Table below

TABLE

| Exp. No. | Feed, g/h | T, ° C. | P, mbar | t, min | Vapor, g | Residue, g | H$_2$O, % wt |
|---|---|---|---|---|---|---|---|
| 1 | 152 | 95 | 51 | 12 | 14.3 | 16.1 | 1.94 |
| 2 | 141 | 105 | 51 | 13 | 15.0 | 15.7 | 1.46 |

The above experiments show that water can effectively be evaporated from aqueous saccharides solutions after admixture with a high boiling carrier liquid, yielding a suspension of mainly carrier liquid and solid saccharides. The results also show that the vapor fractions do not contain any saccharides.

The invention claimed is:

1. A process for the production of solid saccharides from an aqueous saccharides solution comprising:
    admixing the aqueous saccharides solution with a carrier liquid, in which the saccharides are insoluble and the carrier liquid, which has not been heated, has a boiling point higher than that of water, to obtain an aqueous admixture, and
    subjecting the aqueous admixture to an evaporation step in an evaporator, wherein the heat for the evaporation is at least partially supplied by a heated surface area of the evaporator, to yield a vapor fraction comprising water, and a residue fraction comprising solid saccharides and carrier liquid,
    wherein the evaporation step is conducted in one or more equipments selected from the group consisting a stirrer evaporator, a rising film evaporator, a circulation evaporator, a forced circulation evaporator, a falling film evaporator, a rising-falling film evaporator, a spiral tube evaporator, a thin film evaporator and a short path distillation unit, and
    wherein the residue fraction is separated into a solids stream comprising the solid saccharides and a liquid stream comprising the carrier liquid.

2. The process according to claim 1, wherein the aqueous saccharide solution comprises at least one of glucose, fructose, mannose, arabinose, xylose, sucrose, cellobiose, maltose, cellotriose, maltotriose, cellodextrins, dextrins, xylan-oligosaccharides, mannan-oligosaccharides, arabinan-oligosaccharides, oligofructans, starch and cellulose.

3. The process according to claim 1, wherein the aqueous saccharide solution has a saccharide concentration of 10 to 90% wt, based on the solution.

4. The process according to claim 1, wherein the aqueous saccharide solution further comprises an acid, selected from the group consisting of hydrochloric acid, hydrobromic acid, nitric acid, formic acid and combinations thereof.

5. The process according to claim 4, wherein the aqueous saccharide solution contains the acid at a concentration of 1 to 45% wt, based on the solution.

6. The process according to claim 1, wherein the aqueous saccharide solution is a biomass hydrolysate, a sugar cane juice, a sugar beet juice, an aqueous solution of glucose and fructose or a combination thereof.

7. The process according to claim 1, wherein the carrier liquid has a boiling point of at least 175° C.

8. The process according to claim 1, wherein the carrier liquid is immiscible with water.

9. The process according to claim 1, wherein the carrier liquid is hydrocarbon oil or a polymer of an alkylene oxide.

10. The process according to claim 1, wherein the evaporation step is conducted in the one or more equipments selected from the group consisting of the rising film evaporator, the falling film evaporator, the rising-falling film evaporator and the short path distillation unit.

11. The process according to claim 1, wherein the evaporation is carried out at a temperature in the range of 50 to 120° C.

12. The process according to claim 1, wherein the evaporation is carried out at a pressure below 100 mbar.

13. The process according to claim 1, wherein the residue fraction is separated by means of a solid-liquid separation operation selected from the group consisting of settling, filtration, hydrocyclone separation, centrifugation and combinations thereof.

14. The process according to claim 1, wherein the solids stream is washed.

15. The process according to claim 1, wherein the residue fraction is mixed with a second solvent that is immiscible with the carrier liquid and in which the solid saccharides are soluble yielding two liquid phases, and wherein the two liquid phases are separated to yield a solution stream comprising the saccharides dissolved in the second solvent and a second liquid stream comprising the carrier liquid.

16. The process according to claim 15, wherein the carrier liquid is immiscible with water and the second solvent is water.

17. The process according to claim 15, wherein the two liquid phases are separated by means of one or more liquid-liquid separators, selected from the group consisting of a gravity settler, an enhanced gravity settler, a coalescer, a hydrocyclone, a centrifuge and combinations thereof.

18. The process according to claim 1, wherein the liquid stream, comprising the carrier liquid, is at least partly recycled for admixture with the aqueous saccharides solution.

* * * * *